United States Patent
Cave et al.

(10) Patent No.: US 11,146,414 B2
(45) Date of Patent: Oct. 12, 2021

(54) METHODS AND APPARATUS TO LOCATE UNKNOWN MEDIA DEVICES

(71) Applicant: The Nielsen Company (US), LLC, New York, NY (US)

(72) Inventors: Mark Cave, Palm Harbor, FL (US); Joseph Kerkes, Lutz, FL (US)

(73) Assignee: The Nielsen Company (US), LLC

(*) Notice: Subject to any disclaimer, the term of this patent is extended or adjusted under 35 U.S.C. 154(b) by 0 days.

(21) Appl. No.: 15/595,613

(22) Filed: May 15, 2017

(65) Prior Publication Data

US 2018/0331915 A1     Nov. 15, 2018

(51) Int. Cl.
*H04L 12/18*     (2006.01)
*H04L 12/26*     (2006.01)
*H04L 12/58*     (2006.01)

(52) U.S. Cl.
CPC ...... *H04L 12/1831* (2013.01); *H04L 43/0876* (2013.01); *H04L 51/043* (2013.01); *H04L 51/20* (2013.01)

(58) Field of Classification Search
CPC ... H04L 41/12; H04L 41/046; H04L 41/0213; H04L 12/18; H04L 12/1831
See application file for complete search history.

(56) References Cited

U.S. PATENT DOCUMENTS

| | | | |
|---|---|---|---|
| 8,004,660 B2 | 8/2011 | Brown | |
| 8,599,758 B1* | 12/2013 | Ogale | H04W 4/04 370/328 |
| 9,113,286 B1* | 8/2015 | Adams | G06Q 30/0623 |
| 2003/0064745 A1 | 4/2003 | Benveniste | |
| 2007/0006250 A1 | 1/2007 | Croy et al. | |
| 2010/0161523 A1 | 6/2010 | Li et al. | |
| 2013/0215006 A1 | 8/2013 | Liss et al. | |
| 2013/0275205 A1* | 10/2013 | Vinson | G06Q 30/0243 705/14.42 |

(Continued)

FOREIGN PATENT DOCUMENTS

| | | |
|---|---|---|
| WO | 2016032555 | 3/2016 |
| WO | 2016064747 | 4/2016 |

OTHER PUBLICATIONS

International Searching Authority, "International Search Report and Written Opinion," issued in connection with International Patent Application No. PCT/US2018-032712, dated Aug. 29, 2018, 10 pages.

(Continued)

*Primary Examiner* — Jeffrey M Rutkowski
*Assistant Examiner* — Jasper Kwoh
(74) *Attorney, Agent, or Firm* — Hanley, Flight & Zimmerman, LLC (57) ABSTRACT

An apparatus and method to automatically determine the location of unknown media devices is disclosed. An example apparatus includes a media device detector to detect an unknown media device identified in monitoring data collected by an audience measurement device at a location determined to have an "on" status, a media transmission detector to detect a media transmission associated with a device address and an association storer to store an association of the device address, the unknown media device and the location. A probability determiner determines a probability that the unknown media device is located at the location.

20 Claims, 7 Drawing Sheets

(56) References Cited

U.S. PATENT DOCUMENTS

| | | | |
|---|---|---|---|
| 2013/0311478 A1 | 11/2013 | Frett et al. | |
| 2013/0347016 A1* | 12/2013 | Rowe | H04N 21/252 |
| | | | 725/13 |
| 2014/0033317 A1* | 1/2014 | Barber | G06Q 30/0242 |
| | | | 726/26 |
| 2014/0187268 A1* | 7/2014 | Browne | G06Q 30/0201 |
| | | | 455/456.3 |
| 2014/0317270 A1* | 10/2014 | Besehanic | H04H 60/32 |
| | | | 709/224 |
| 2014/0359675 A1* | 12/2014 | Mank | H04L 12/2805 |
| | | | 725/80 |
| 2015/0169628 A1* | 6/2015 | Maennel | H04W 64/00 |
| | | | 707/775 |
| 2015/0373123 A1* | 12/2015 | Warrick | H04L 67/141 |
| | | | 709/228 |
| 2016/0007083 A1* | 1/2016 | Gurha | H04N 21/44222 |
| | | | 725/13 |
| 2016/0112522 A1* | 4/2016 | Abello | H04L 67/22 |
| | | | 709/224 |
| 2016/0295373 A1* | 10/2016 | Ronen | H04W 4/029 |
| 2016/0360377 A1* | 12/2016 | Lovich | H04W 4/029 |
| 2016/0379233 A1 | 12/2016 | Besehanic et al. | |

OTHER PUBLICATIONS

European Patent Office, "Communication pursuant to Rules 70(2) and 70a(2) EPC" issued in connection with European Patent Application No. 18802483.0, dated Jan. 19, 2021, 1 pages.

European Patent Office, "Extended European Search Report," issued in connection with European Patent Application No. 18802483.0, dated Dec. 17, 2020, 9 pages.

\* cited by examiner

FIG. 1

| SITE | MAC 1 | MAC 2 | MAC 3 | MAC 4 | TOTAL |
|---|---|---|---|---|---|
| 1 ON | 7 | 3 | 1 | 1 | 12 |
| 2 ON |   | 1 | 7 |   | 8 |
| 3 ON | 1 |   |   |   | 1 |
|   | 8 | 4 | 8 | 1 | 21 |

METHODS AND APPARATUS TO LOCATE UNKNOWN MEDIA DEVICES

FIELD OF THE DISCLOSURE

This disclosure relates generally to monitoring network activity, and, more particularly, to methods and apparatus to locate unknown media devices.

BACKGROUND

Media providers and/or metering entities such as, for example, advertising companies, broadcast networks, etc. are often interested in the viewing, listening, and/or media behavior/interests of audience members and/or the public in general. To collect these behavior/interests, an audience measurement company may enlist panelists (e.g., persons agreeing to be monitored) to cooperate in an audience measurement study for a period of time. The media usage habits of these panelists as well as demographic data about the panelists is collected and used to statistically determine the size and demographics of a viewing audience In recent years, more consumer devices have been provided with Internet connectivity and the ability to retrieve media from the Internet. As such, media exposure has shifted away from conventional methods of presentation, such as broadcast television, towards presentation via consumer devices accessing the Internet to retrieve media for display.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

As used herein, the term "media" includes any type of content, such as television programming, radio programming, news, advertisements, movies, web sites, etc. Example methods, apparatus, and articles of manufacture disclosed herein identify media devices and/or types of media devices for media measurement. Such media devices may include, for example, Internet-enabled televisions, personal computers, Internet-enabled mobile handsets (e.g., a smartphone), video game consoles (e.g., Xbox®, Playstation® 3), tablet computers (e.g., an iPad®), digital media players (e.g., a Roku® media player, a Slingbox®, etc.), etc. In some examples, identifications of media devices used in consumer locations (e.g., homes, offices, etc.) are aggregated to determine ownership and/or usage statistics of available media devices, relative rankings of usage and/or ownership of media devices, types of uses of media devices (e.g., whether a device is used for browsing the Internet, streaming media from the Internet, etc.), and/or other types of media device information.

In some disclosed examples, a media device includes a network interface to transmit a request for media to be presented by the media device. In such examples, the media device requests media from a media provider via a network (e.g., the Internet). In some examples, the request for content is a HyperText Transfer Protocol (HTTP) request, a Session Initiation Protocol (SIP) message, a domain name service (DNS) query, a file transfer protocol (FTP) request, and/or any other type of request for content.

Some networks utilize Internet Protocol (IP) for communication. The IP address scheme utilizes IP addresses assigned to media devices. For example, a media device might be assigned an IP version 4 (IPv4) address of 192.168.0.2. Any other past, present, and or future addressing scheme may additionally or alternatively be used such as, for example, IP version 6 (IPv6). In some examples, IP addresses are dynamically assigned using DHCP. Both public and private IP addresses may be assigned using DHCP. In some examples, the IP address assignment is referred to as a lease. IP address leases are generally time-dependent in that they are only valid for a particular period of time (e.g., one day, one week, one month, etc.) After the expiration of the lease, the media device requests a new IP address from a DHCP server (e.g., a router, a server, etc.). Accordingly, more than one IP address might be associated with a media device over an extended period of time. For example, at a first time, the media device might be identified by an IP address of 192.168.0.2, while at a second time, the media device might be identified by an IP address of 192.168.0.3. Further, a second media device may be assigned the first IP address at the second time. Accordingly, identifying which device is associated with network requests occurring on a network based on the IP address alone is difficult.

Internet Service Providers (ISPs) typically provide a single public Internet protocol (IP) address for each media exposure measurement location (e.g., a media presentation location, a panelist household, an internet café, an office, etc.) receiving Internet services. In some examples, multiple devices (e.g., media devices) are communicatively coupled by a local area network (LAN) at a media exposure measurement location. In some examples, the LAN includes a router and/or gateway that accesses another network (e.g., the Internet) using a public IP address associated with the media exposure measurement location.

Within the LAN, individual media devices are given private IP addresses by, for example, a dynamic host control protocol (DHCP.) When a media device within the LAN transmits a request to a resource outside of the LAN (e.g., on the Internet) the router and/or gateway translates the originating (private) IP address of the device making the query to the public address of the router and/or gateway before relaying the request outside of the LAN (e.g., to the Internet). Thus, when the resource outside of the LAN receives the request, the resource is able to transmit a return message (e.g., a response) to the LAN via the public IP address in the LAN. On the return path, the router and/or gateway in the LAN translates the destination IP (identifying the public IP address) address of the response to the private IP address of the requesting device so that the return message may be delivered to the media device that made the original request.

Network interfaces of media devices are provided with a media access control (MAC) address. The MAC address is a serial number of the network interface of the media device. MAC addresses are used when issuing IP addresses to identify the media device to which the IP address is assigned. Unlike an IP address, the MAC address does not change over time. The MAC address of a media device is provided by the hardware manufacturer of the media device at the time of manufacture. In some examples, the MAC address may be changed at a later time (e.g., after manufacturing the device). In examples disclosed herein, the MAC address is a forty-eight bit identifier, and is commonly represented as a twelve character hexadecimal identifier. However, any other representation may additionally or alternatively be used.

In some examples, the MAC address includes a twenty-four bit organizationally unique identifier (OUI). An OUI is used to identify the manufacturer and/or model of the media device. In some examples, the first twelve bits of the OUI identify a manufacturer, while the second twelve bits of the OUI identify a model of the device. Accordingly, a manufacturer and/or model of a device may be identified based on the OUI. The OUI, however, does not distinguish between multiple media devices of the same manufacturer and model. For example, a first iPad may have the same OUI as a second iPad. However, the devices will be uniquely identified by the remainder of the MAC address (e.g., the portion of the MAC address following the OUI).

When transmitting network communications (e.g., transmission control protocol (TCP) communications, user datagram protocol (UDP) communications, etc.), the MAC address of the media device is not included in the communication. Rather, the IP address is used to identify the media device. As disclosed above, the IP address may change over time and, therefore, may not accurately identify the media device. To translate an IP address into a MAC address, media devices include an address resolution protocol (ARP) table. However, any other type of table may additionally or alternatively be used such as, for example a neighbor discovery protocol (NDP) (e.g., for use with IP version 6 (IPv6)). The ARP table enables translation from an IP address to a MAC address. The ARP table is maintained by media devices (e.g., a router and/or a gateway). Accordingly, a media device can be associated with network communications even though the IP address associated with the media device may change.

In some examples, network resources (e.g., servers providing media to the media devices) are identified by domain names. Domain names are human readable identifiers that identify a network resource. While an IP address of a network resource might change over time, the domain name typically remains the same. Domain names typically remain the same because they are purchased by the content provider as a way for users to easily identify the service provided by the service provider. As the IP address of the content provider changes (e.g., because the content provider is now hosting their service via a different server, etc.), the domain name is updated to be associated with the most recent IP address.

In some examples, media devices that are capable of individually being monitored via an on-device meter (e.g., a software meter installed at the media device) are used within a media exposure measurement location. The monitored media device may be, for example, a personal computer, a smart phone, a tablet, etc. In some examples, the on-device meter collects monitoring information regarding the network communications and/or activities of the media device. In some examples, the on-device meter collects information in addition to the network communications of the monitored media device such as, for example, indicia of user input, indicia of information presented by the monitored network device, etc.

However, not all media devices are capable of being monitored by an on-device meter. For example some media devices do not allow for installation of third-party software (e.g., an on-device meter). Further, because there are many types of media devices available, maintaining on-device meter software packages for every type of media device is difficult. Because installation of a monitoring system on all types of network devices is difficult, if not impossible, some network devices may go unmonitored.

In examples disclosed herein, a device identifier is used to identify the media device as being associated with a panelist and/or a household for monitoring purposes. For example, a media device may be associated with a panelist and/or a household, and may receive a unique identifier (e.g., "Suzie's iPAD", "Smith Family iPad 01", etc.) to facilitate such association. In some examples, the MAC address is associated with the device identifier. In examples disclosed herein, the assignment of the unique identifier (e.g., a device identifier) and the association with a MAC address of the device is made by an installer (e.g., a representative of a media monitoring entity) and/or by a user of the media device. However, any other party may assign and/or associate the device identifier with the media device and/or the MAC address of the media device.

In examples disclosed herein, a network communications monitor is used to capture network communications of media devices on the network (e.g., a home network). The network communications monitor is installed at the media exposure measurement location and identifies network communications to and/or from media devices within the media exposure measurement location (e.g., the communications of devices sharing a public IP address via, for example, a gateway). Thus, the network communications monitor monitors all network devices within the media exposure measurement location. The network communications monitor creates a log and/or a record of the network communications, identifies a device associated with the network communications (e.g., a device that originated and/or is to receive the network communication), and transmits the log and/or the record to the network activity measurement system. In examples disclosed herein, the network communications monitor determines a device identifier of the identified device based on a MAC address of the device involved in the network communications. While the MAC address is not contained in the network communications itself, it can be derived by using, for example, an address resolution protocol (ARP) lookup based on an IP address identified in the network communication. In some examples, the log of network communications created by the network communications monitor may be transmitted by physically mailing the log (e.g., a log stored on a memory device such as, for example, a flash memory, a compact disc, a DVD, etc.).

Some example methods, apparatus, and articles of manufacture disclosed herein are located at a media exposure measurement location having one or more media devices. Some of these example methods, apparatus, and articles of manufacture are interposed between the media devices and a wide area network (WAN), such as the Internet, that includes one or more content providers that provide media in response to request(s) from the media devices. Some example methods, apparatus, and articles of manufacture disclosed herein intercept messages to and/or from the WAN (e.g., media requests from media devices on the same LAN as the intercepting method, apparatus, or article of manufacture). When intercepting messages to and/or from the WAN, in some examples, the network communications monitor identifies an internal (e.g., private) IP address associated with the intercepted message (e.g., a destination IP address or a source IP address). In some examples, the internal IP address is used when determining the MAC address of the media device associated with the intercepted message.

Some example methods, apparatus, and articles of manufacture disclosed herein inspect the network communications to determine if the network communications should be recorded. Not all network requests are of interest to the monitoring entity. For example, when the network communications monitor identifies hypertext transfer protocol (HTTP) requests, the network communications are transmitted to a network activity measurement system and/or stored for transmission to the network activity measurement system at a later time. In contrast, when the network communications monitor identifies a message not associated with media presentation (e.g., a border gateway protocol (BGP) message), the network communications monitor may ignore such a message. In some other examples, the message may be ignored when a device identifier and/or a MAC address cannot be determined. Some such example methods, apparatus, and articles of manufacture additionally or alternatively determine ownership and/or usage statistics based on messages from the WAN to the media devices on the LAN. Some example methods, apparatus, and articles of manufacture disclosed herein determine the type(s) of media device based on the network communications (e.g., via HTTP queries contained in the communications, via a MAC address associated with the media device, via a device identifier associated with the media device, etc.) but, unlike media providers that track usage statistics, do not return media to the media device(s) in response to the network communications.

Figure 1:
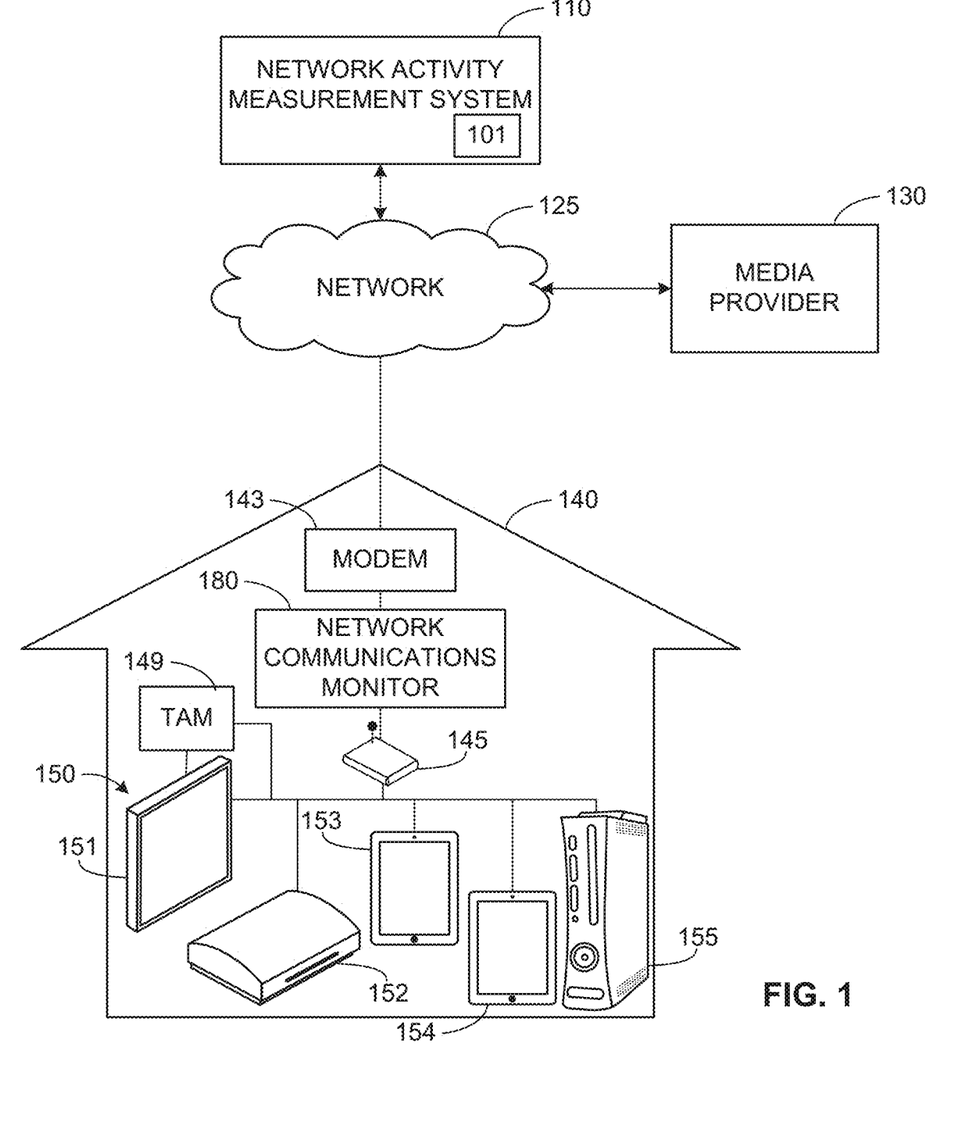
FIG. 1 is a block diagram of an example environment of use of an unknown media device locator.

FIG. 1 is a block diagram of an example operating environment 100 of an unknown media device locator 101. The example, unknown media device locator 101 locates unknown media devices (e.g., devices that are at unknown locations of an exposure measurement location) that are detected in media exposure measurement locations that are a part of operating environments such as the example operating environment 100. The example operating environment 100 of FIG. 1 includes an example network activity measurement system 110, a television audience measurement (TAM) device 149, an example network communications monitor 180 to monitor communications across a network 125, and the example unknown media device locator 101. The example operating environment 100 of FIG. 1 illustrates an example media exposure measurement location 140 in communication with an example media provider 130 via the example network 125. The example media exposure measurement location 140 of FIG. 1 includes an example network gateway 145, an example modem 143, and example network devices 150. In the illustrated example, network devices 150 include a first media device 151, a second media device 152, a third media device 153, a fourth media device 154, and a fifth media device 155.

The network activity measurement system 110 of the illustrated example collects and processes network communications from the media devices 150 to generate media device information. The network activity measurement system 110 of FIG. 1 analyzes the network communications across multiple measurement locations such as the example measurement location 140 to identify, for example, which media devices are the most owned, the most-frequently used, the least-frequently owned, the least-frequently used, the most/least-frequently used for particular type(s) and/or genre(s) of media, and/or any other media statistics or aggregate information that may be determined from the data. The media device information may also be correlated or processed with factors such as geodemographic data (e.g., a geographic location of the media exposure measurement location, age(s) of the panelist(s) associated with the media exposure measurement location, an income level of a panelist, etc.) Media device information may be useful to manufacturers and/or advertisers to determine which features should be improved, determine which features are popular among users, identify geodemographic trends with respect to media devices, identify market opportunities, and/or otherwise evaluate their own and/or their competitors' products.

The network 125 of the illustrated example of FIG. 1 is a wide area network (WAN) such as the Internet. However, in some examples, local networks may additionally or alternatively be used. For example, multiple networks may be utilized to couple the components of the example environment 100 to identify media devices.

In the illustrated example, the media devices 150 of FIG. 1 are devices that retrieve media from the media provider 130 for presentation at the media exposure measurement location 140. In some examples, the media devices 150 are capable of directly presenting media (e.g., via a display) while, in some other examples, the media devices 150 present the media on separate media presentation equipment (e.g., speakers, a display, etc.). The first media device 151 of the illustrated example is an Internet enabled television, and thus, is capable of directly presenting media (e.g., via an integrated display and speakers). The second media device 152 of the illustrated example is a first gaming console (e.g., Xbox®, Playstation® 3, etc.) and requires additional media presentation equipment (e.g., a television) to present media. The third media device 153 and the fourth media device 154 are tablet devices. In the illustrated example, the third media device 153 and the fourth media device 154 are the same type of device from the same manufacturer (e.g., both the third media device 153 and the fourth media device 154 are Apple iPads). Accordingly, the OUI (e.g., a manufacturer and/or device specific portion of the MAC address) of the third media device 153 and the fourth media device 154 are the same. The fifth media device 155 of the illustrated example is a second gaming console (e.g., Xbox®, Playstation® 3, etc.) and requires additional media presentation equipment (e.g., a television) to present media. Although the fifth media device 155 and the second media device 152 are both gaming consoles, they are not made by the same manufacturer and, accordingly, do not share the same OUI. While, in the illustrated example, an Internet enabled television, gaming consoles, and tablet devices are shown, any other type(s) and/or number(s) of media device(s) may additionally or alternatively be used. For example, Internet-enabled mobile handsets (e.g., a smartphone), tablet computers (e.g., an iPad®, a Google Nexus, etc.) digital media players (e.g., a Roku® media player, a Slingbox®, etc.) etc. may additionally or alternatively be used. Further, while in the illustrated example five media devices are shown, any number of media devices may be used. In the illustrated example, media devices 150 may be wired devices (e.g., connected to the network communications monitor 180 via wired connection such as, for example, an Ethernet connection) the media devices 150 may additionally or alternatively be wireless devices (e.g., connected to the network communications monitor 180 via a wireless connection such as, for example, a WiFi connection, a Bluetooth connection, etc.).

The media provider 130 of the illustrated example of FIG. 1 is a server providing media (e.g., web pages, videos, images, etc.). The media provider 130 may be implemented by any provider(s) of media such as a digital broadcast provider (e.g., a cable television service, a fiber-optic television service, etc.) and/or an on-demand digital content provider (e.g., Internet streaming video and/or audio services such as Nefflix®, YouTube®, Hulu®, Pandora®, Last.fm®,) and/or any other provider of streaming media services. In some other examples, the media provider 130 is a host for a web site(s). Additionally or alternatively, the media provider 130 may not be on the Internet. For example, the media provider may be on a private and/or semi-private network (e.g., a LAN.)

The media exposure measurement location 140 of the illustrated example of FIG. 1 is a panelist household. However, the media exposure measurement location 140 may be any other location, such as, for example an internet café, an office, an airport, a library, a non-panelist household, etc. While in the illustrated example a single media exposure measurement location 140 is shown, any number and/or type(s) of media exposure measurement locations may be used.

The modem 143 of the illustrated example of FIG. 1 is a modem that enables network communications of the media exposure measurement location 140 to reach the network 125. In some examples, the modem 143 is a digital subscriber line (DSL) modem, while in some other examples the modem 143 is a cable modem. In some examples, the modem 143 is a media converter that converts one communications medium (e.g., electrical communications, optical communications, wireless communications, etc.) into another type of communications medium. In the illustrated example, the modem 143 is separate from the network gateway 145. However, in some examples, the modem 143 may be a part of (e.g., integral to) the network gateway 145.

The example network gateway 145 of the illustrated example of FIG. 1 is a router that enables the media devices 150 to communicate with the network 125 (e.g., the Internet.) In some examples, the example network gateway 145 includes gateway functionality such as modem capabilities. In some other examples, the example network gateway 145 is implemented in two or more devices (e.g., a router, a modem, a switch, a firewall, etc.).

In some examples, the network gateway 145 hosts a LAN for the media exposure measurement location 140. In the illustrated example, the LAN is a wireless local area network (WLAN) that communicates wirelessly with the media devices 150, and allows the media devices 150 to transmit and receive data via the Internet.

The network communications monitor 180 of the illustrated example of FIG. 1 is a network device interposed between the LAN hosted by the example network gateway 145 and the network 125. Additionally or alternatively, the network communications monitor 180 may be a device on the LAN. The network communications monitor 180 of the illustrated example identifies network communications from the media devices 150 within the media exposure measurement location 140. The network communications monitor 180 creates a record (e.g., a log) identifying which of the media device(s) 150 were involved in which of the network communications and transmits the record to the network activity measurement system 110. In some examples, the network communications monitor 180 determines which device was involved in the network communications by inspecting the network communications passing through the network communications monitor 180 for indicia that may identify the media device and/or may facilitate identification of the media device (e.g., an IP address that may be used to lookup a MAC address via an ARP table).

In some examples, the example network gateway 145 permits custom firmware and/or software to be loaded and/or executed. In some such examples, the network gateway 145 may be provided with firmware and/or software that, in addition to standard routing and/or modem behavior, monitors messages and/or data packets directed from the media devices 150 to the network 125 and/or directed from the network 125 to the media devices 150. Additionally or alternatively, such monitoring functionality may be part of a separate device such as, for example, the network communications monitor 180. TAM 149 determines when media device 151 is on. A TAM is used to determine the number of people that are in an audience.

Referring to FIG. 1, when an unknown media device operates in media exposure measurement location 140, the TAM 149, detects the unknown media device. In one example, as a part of the detection of the unknown media device, the TAM 149 makes a record of the detection of the unknown media device in monitoring data that it collects. In addition, network communications monitor 180 (e.g., DMX) identifies media transmissions that are associated with the unknown media device's MAC address. In one example, the data that the TAM 149 and the network communications monitor 180 generates is accessed by the unknown media device locator 101 and used to determine the location of the unknown media device. As a part of locating the unknown media device, the unknown media device locator 101 associates the address, the unknown media device and the location. Thereafter, unknown media device locator 101 determines, by executing one or more instructions via a processor, a probability that the unknown media device is located at the location.

Unknown media device locator 101 locates devices using internet connectivity to the viewing site. The locating of media devices is performed in an automated and iterative manner. Unknown media device locator 101 determines what device is connected by monitoring television (TV) (or other media presentation device) on/off times and MAC addresses of devices that have internet activity during the television "on" period. An iterative approach determines, through association, which device is connected to each TV site over time.

Conventional installation approaches can be cumbersome and addressing the problem of automating such is desirable. For example, conventional installation is manual and requires interaction with every device in the home that can connect to the internet. Unknown media device locator 101 obviates manual installation by determining the probability that a device has connected to, and is associated with, a particular site (e.g., such as a room that is associated with a panelist in an exposure location 140). Over time, as more data is collected, the probability is improved. In this manner, unknown media device locator 101, in an automated and iterative manner, obviates the involvement of installation personnel to manually install each site according to an installation table (such as a DMX-S installation table).

In one example, an installer can perform an initial outfitting of a home with the example TAM 149 and then place the example network communications monitor 180 in the appropriate location (e.g., as defined in an installation manual). The network communications monitor 180 collects MAC addresses and all other associated streaming information and forwards it to the example network activity measurement system 110. At the network activity measurement system 110, the unknown media device detector 101 identifies the site(s) that is "on" and associates the MAC address to the site(s) that is "on" to build a probability table of the associations. The strongest association indicates the probable site (e.g., location) of the unknown device. As such, the location of an unknown media device is identified without the installer manually identifying the site of each media device in the home. Furthermore, a new location could be learned if a media device is relocated. Each time a TV is "on" and the MAC address is detected the table is updated.

Figure 2:
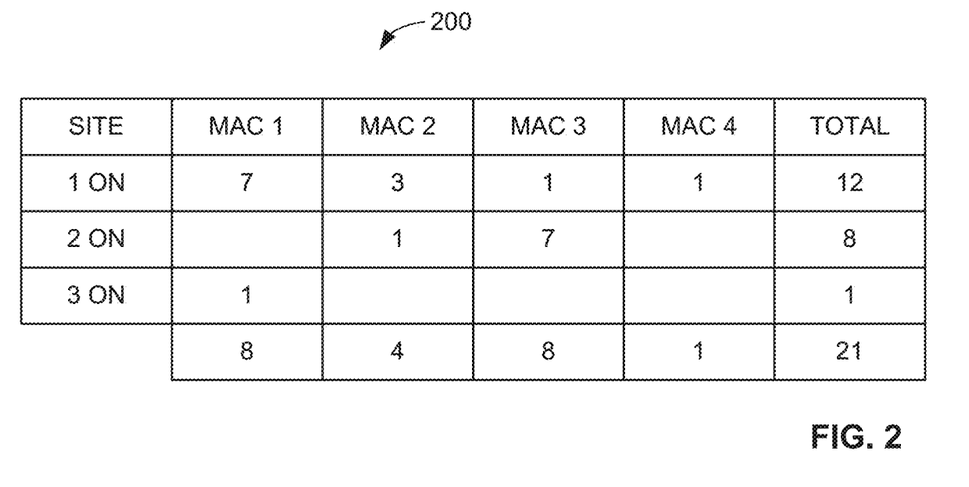
FIG. 2 shows an example probability table.

FIG. 2 shows an example probability table 200 that tracks the total number of times that MAC addresses are detected at different sites when a television associated with the site is detected as being "on." Table 200 includes columns for site 201, media access control (MAC) address 203, MAC address 205, MAC address 207, MAC address 209 and total 211. Referring to FIG. 2, table 200 shows that when a television associated with site 1 was detected "on" MAC addresses were detected 12 times, when a television associated with site 2 was detected "on" MAC addresses were detected 8 times, and when a television associated with site 3 was detected "on" MAC addresses were detected 1 time. In addition, table 200 shows the number of times each MAC address was detected transmitting when a television associated with a respective site was detected "on." In one example, the stored associations of the MAC addresses and the "on" sites of table 200 enable the determination of a probability that an unknown media device is located at a particular place among the sites.

Figure 3:
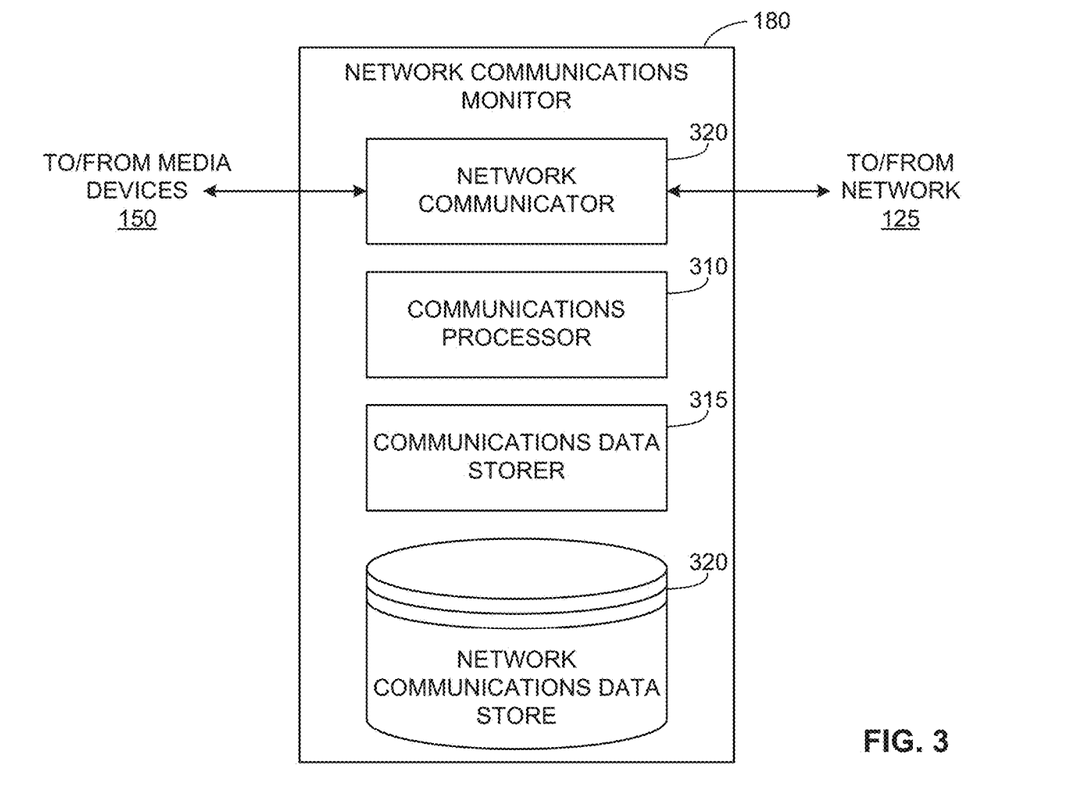
FIG. 3 is a block diagram of an example network communications monitor to implement the network communications monitor of FIG. 1.

FIG. 3 is a block diagram of an example implementation of the network communications monitor 180 of FIG. 1. The example network communications monitor 180 of FIG. 3 includes an example network communicator 305, an example communications processor 310, an example communications data storer 315 and an example communications data store 320.

The network communicator 305 of the illustrated example of FIG. 3 is an Ethernet interface. In the illustrated example, the network communicator 310 receives network communications (e.g., HTTP requests, etc.) from the network gateway 145, the media devices 150, and/or the modem 143. The network communicator 305 transmits the network communications to the example network 125, and receives and/or transmits network communications in the reverse path (e.g., towards the LAN). While in the illustrated example, the network communicator 305 is an Ethernet interface, any other type of interface may additionally or alternatively be used. For example, the network communicator 305 might include one or more of a Bluetooth interface, a WiFi interface, a digital subscriber line (DSL) interface, a T1 interface, etc. While in the illustrated example a single network communicator 305 is shown, any number and/or type(s) of network communicators may additionally or alternatively be used. For example, two network communicators (e.g., Ethernet interfaces) may be used. In such an example, a first network communicator may receive and/or transmit network communications to and/or from the network gateway 145 while a second network communicator may receive and/or transmit network communications to and/or from the network 125.

The communications processor 310 of the illustrated example of FIG. 3 inspects network communications received by the network communicator 305. The example communications processor 310 of FIG. 3 is implemented by a processor executing instructions, but it could alternatively be implemented by an Application Specific Integrated Circuit (ASIC), Digital Signal Processor (DSP), Field Programmable Gate Array (FPGA), or other circuitry. In the illustrated example, the communications processor 310 filters network communications received by the network communicator 305 to identify network communications of the media devices 150. Further, the communications processor 310 identifies the media device 150 involved in the network communications. In examples disclosed herein, the communications processor 310 identifies the media device 150 by determining a device identifier of the media device 150 and/or a MAC address of the media device 150.

The communications data storer 315 of the illustrated example of FIG. 3 stores network communications identified by the communications processor 310 in the network communications data store 320. The example data storer 315 of the illustrated example is implemented by a processor executing instructions, but it could alternatively be implemented by an ASIC, DSP, FPGA, or other circuitry. The communications processor 310 and the data storer 315 may be implemented by the same physical processor. In the illustrated example, network communications identified by the communications processor 310 are stored in association with the media device(s) 150 identified as receiving and/or transmitting a network communications.

The network communications data store 320 of the illustrated example of FIG. 3 may be any device for storing data such as, for example, flash memory, magnetic media, optical media, etc. Furthermore, the data stored in the network communications data store 320 may be in any data format such as, for example, binary data, comma delimited data, tab delimited data, structured query language (SQL) structures, etc. While, in the illustrated example, the network communications data store 320 is illustrated as a single database, the network communications data store 320 may be implemented by any number and/or type(s) of databases.

Figure 4:
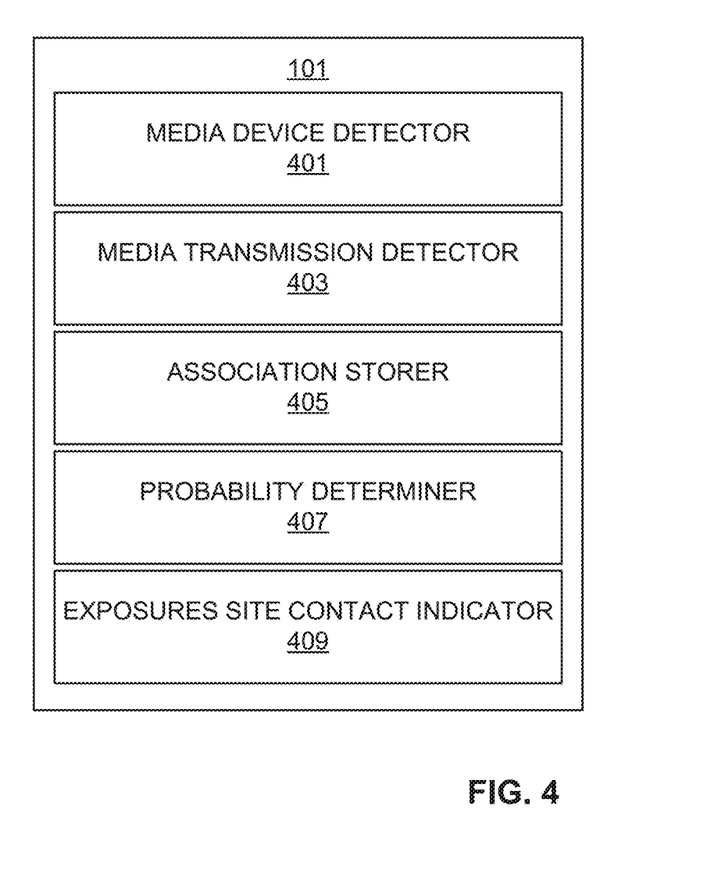
FIG. 4 shows components of an unknown media device locator according to one example.

FIG. 4 is a block diagram of an example implementation of the unknown media device locator 101 of FIG. 1. In one embodiment, components of unknown media device locator 101 implement an algorithm for locating unknown media devices. The example, unknown media device locator 101 includes and example media device detector 401, an example media transmission detector 403, an example association storer 405, an example probability determiner 407 and an example exposure site contact indicator 409.

Referring to FIG. 4, the media device detector 401 detects an unknown media device. In one example, the media device detector 401 detects the unknown media device by determining if the unknown media device is identified in monitoring data collected by an audience measurement device at a location (e.g., audience measurement device 149 in FIG. 1).

Media transmission detector 403 detects, by executing an instruction via a processor, a media transmission associated with a device address. In one example, media transmission detector 403 detects the media transmission associated with the device address by determining if the media transmission is detected by a network communications monitor (e.g., network communications monitor 180 in FIG. 1). In one example, the network communications monitor identifies the media device type.

Association storer 405 stores an association of the unknown media device address (e.g., MAC address) with the unknown media device and the location. In one example, storer 405 stores the association of the unknown media device address with the unknown media device and location in memory of a network activity measurement system (e.g., network activity measurement system 110 in FIG. 1). In other examples, storer 405 stores the association of the unknown media device address with the unknown media device and location in a location other than that of the network activity measurement system. In one example, storer 405 stores the association of the unknown media device address with the unknown media device and location to have a tabular organization. In one example, storer 405 tracks each detected instance of this association such that a count of the detected instances is stored. In one example, the association of the unknown media device address with the unknown media device and location may be used to build a probability table. In one example, the probability table correlates respective media access control (MAC) addresses with a plurality of sites.

Probability determiner 407 determines, by executing an instruction via a processor, a probability that the unknown media device is located at the location. In one example, probability determiner 407 uses the information stored by association storer 405. For example, probability determiner 407 uses data such as the data that is stored in the above described probability table that associates MAC addresses with sites that are on. In one example, probability determiner 407 uses a correlation of the respective media access control (MAC) addresses with sites that are on. Probability determiner 407, using this information, determines a probability that the unknown media device is located at the location based on the strength of a determined probability. This information is used to define an installation table. See installation table described herein in connection with FIG. 1.

Exposure site contact indicator 409 provides an indication that an exposure site should be contacted when a condition based on the determined probability is satisfied. In one example, the condition is a probability threshold. In another example, the condition is an elapse of a period of time after a probability threshold has been reached.

It should be appreciated that the aforementioned components of census level impressions and unknown media device locator 101 can be implemented in hardware or software or in a combination of both. In one embodiment, components and operations of total number of impressions and unknown media device locator 101 can be encompassed by components and operations of one or more computer components. In another embodiment, components and operations of unknown media device locator 101 can be separate from the aforementioned one or more computer components but can operate cooperatively with components and operations thereof.

While an example manner of implementing the unknown media device locator of FIG. 1 is illustrated in FIG. 4, one or more of the elements, processes and/or devices illustrated in FIG. 4 may be combined, divided, re-arranged, omitted, eliminated and/or implemented in any other way. Further, the example media device detector 401, the example media transmission detector 403, the example association storer 405, the example probability determiner 407, and the example exposure site contact indicator 409 more generally, the example unknown media device locator 101 of FIG. 4 may be implemented by hardware, software, firmware and/or any combination of hardware, software and/or firmware. Thus, for example, any of the example the example media device detector 401, the example media transmission detector 403, the example association storer 405, the example probability determiner 407, and the example exposure site contact indicator 409 more generally, the example unknown media device locator 101 and/or, more generally, the example unknown media device locator 101 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media device detector 401, the example media transmission detector 403, the example association storer 405, the example probability determiner 407, and the example exposure site contact indicator 409 is/are hereby expressly defined to include a tangible computer readable storage device or storage disk such as a memory, a digital versatile disk (DVD), a compact disk (CD), a Blu-ray disk, etc. storing the software and/or firmware. Further still, the example unknown media device locator 101 of FIG. 1 may include one or more elements, processes and/or devices in addition to, or instead of, those illustrated in FIG. 4, and/or may include more than one of any or all of the illustrated elements, processes and devices.

Figure 5:
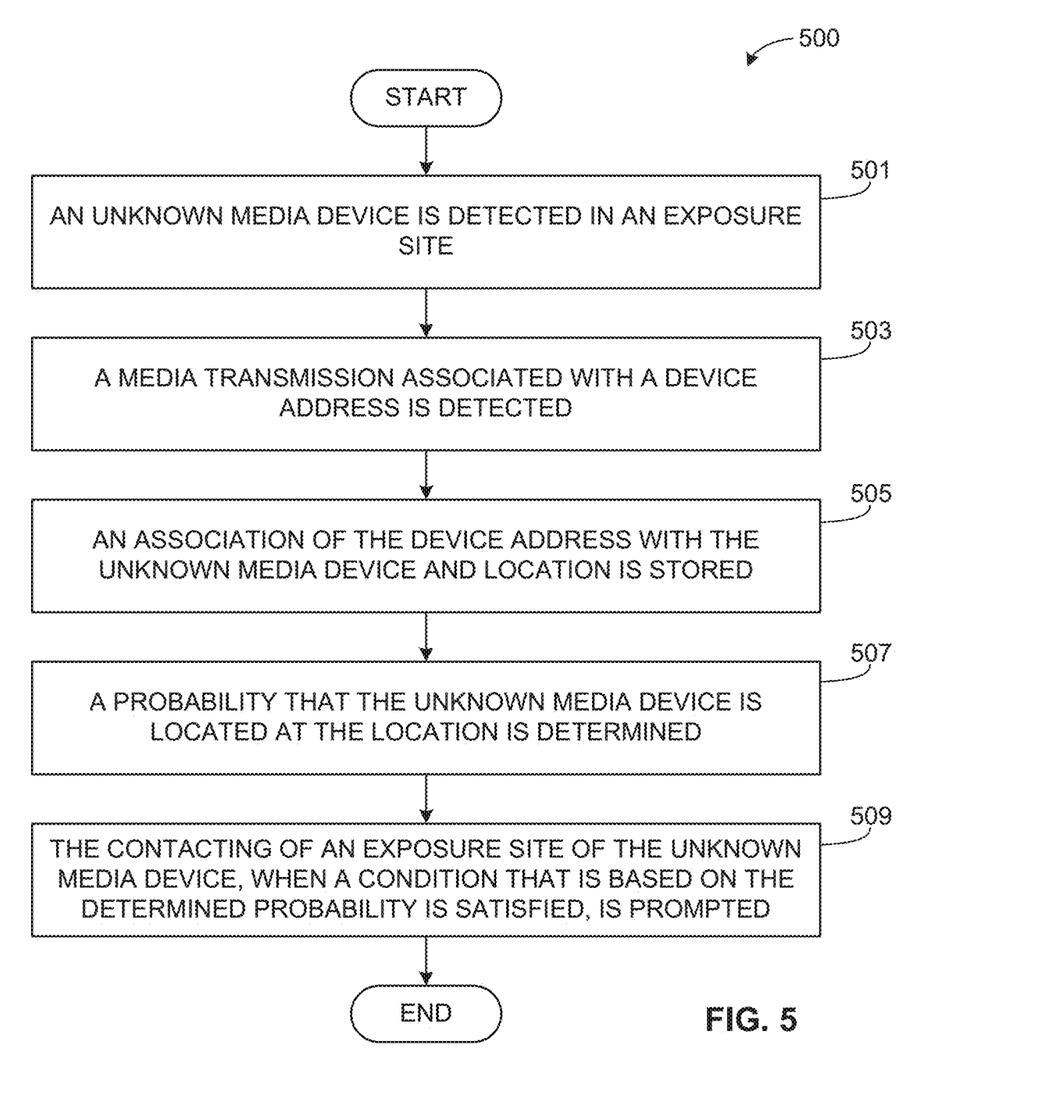
FIG. 5 is a flowchart of a method for automatically locating unknown media devices.
Figure 6:
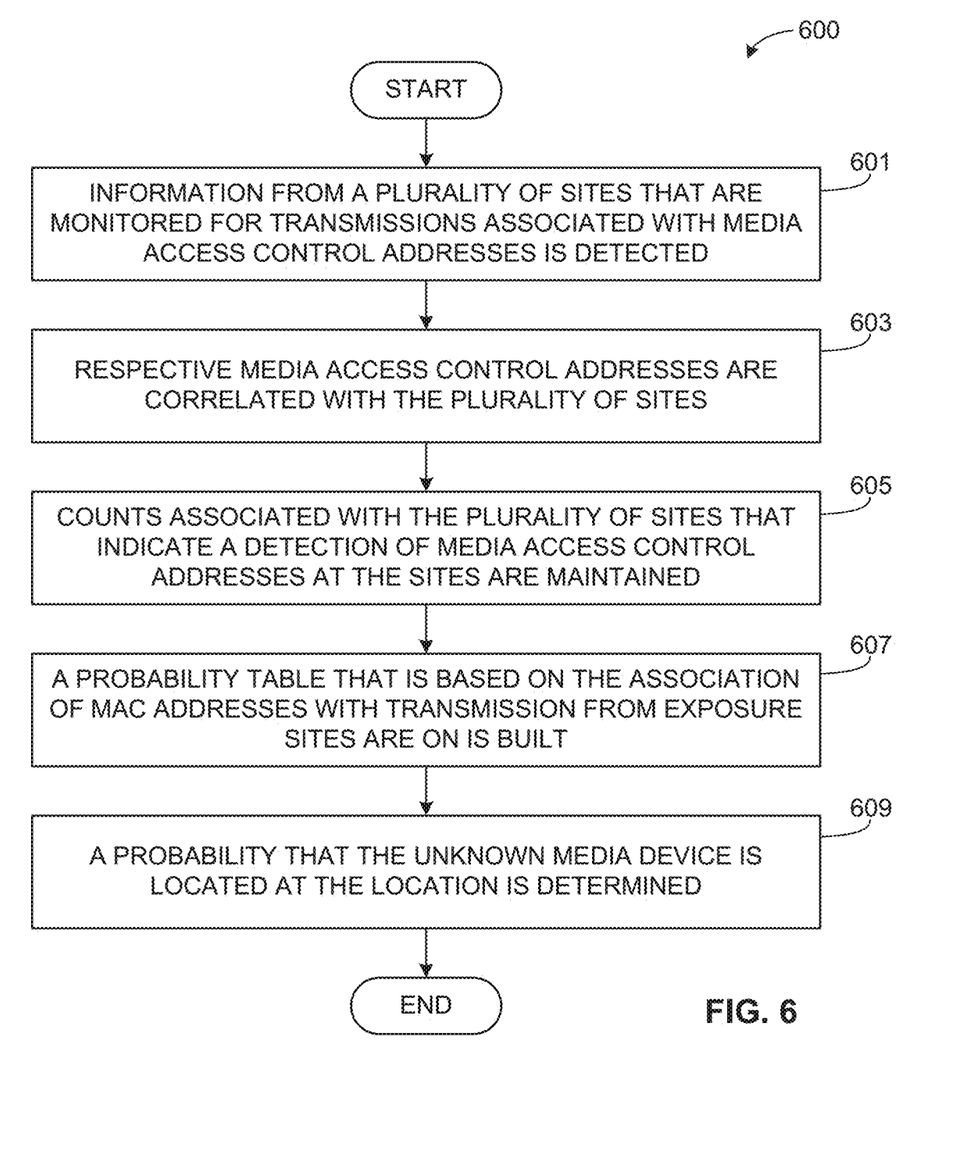
FIG. 6 is a flowchart of a method for determining the probability that an unknown media device is located at a site.

Flowcharts representative of example machine readable instructions for implementing the unknown media device locator 101 of FIG. 1 and/or FIG. 4 are shown in FIGS. 5 and 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the example unknown media device locator 101 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 5 begins at block 501. Referring to FIG. 5, the media device detector 401 (FIG. 4) detects an unknown media device that is present in an exposure site (block 501). In one example, the media device detector 401 detects the unknown media device by determining if the unknown media device is identified in monitoring data that is collected by an audience measurement device that is positioned at the location.

The example media transmission detector 403 (FIG. 4) detects a media transmission associated with a device address (block 503). In one example, the media transmission detector 403 detects the media transmission associated with the device address by determining if the media transmission is detected by a network communications monitor, e.g., 180 in FIG. 1 (for example a DMX).

The example storer 405 (FIG. 4) stores an association of the device address with the unknown media device and the location (block 505). In one example the storer 405 stores the association of the device address with the unknown media device and location in a table (e.g., the example table 200 of FIG. 2). The example storer 405 tracks each detected instance of this association such that a count of the detected instances may be stored. In one example, the association of the device address with the unknown media device and location may be used to build a probability table. In one example, the probability table correlates respective media access control (MAC) addresses with a plurality of sites.

The example probability determiner 407 (FIG. 4) determines a probability that the unknown media device is located at the location (block 507). The example probability determiner 407 determines a probability that the unknown media device is located at the location by using data that associates MAC addresses with sites that are "on." In one example, probability determiner 407 determines probability by accessing probability data, e.g., from a probability table populated with the data that associates MAC addresses with sites that are on. The probability table correlates respective media access control (MAC) addresses with a plurality of sites.

The example, exposure site contact indicator 409 (FIG. 4) prompts the contacting of an exposure site of the media device when a condition that is based on the determined probability is satisfied (block 509). See description of exposure site contact indicator 409 made in connection with FIG. 4. In one example, exposure site contact indicator 409 provides an indication that an exposure site should be contacted when a condition based on the determined probability is satisfied. In one example, the condition is a probability threshold. In another example, the condition is an elapse of a period of time after a probability threshold has been reached.

FIG. 6 is a flowchart of a method for determining the probability that a device associated with a MAC address is transmitting from a site. Referring to FIG. 6, the example media transmission detector 403 (FIG. 4) detects information from a plurality of sites related to transmissions associated with MAC addresses (block 601). In one example, the media transmission detector 403 detects the MAC addresses that are transmitting from sites that are "on."

The example, association storer 405 (FIG. 4) correlates respective MAC addresses with the plurality of sites (block 603). In one example, the association storer 405 correlates respective MAC addresses that are transmitting with the plurality of sites by associating the MAC address with the sites. In one example, this association is used to build a probability table.

The example association storer 405 (FIG. 4) stores counts that indicate a detection of MAC addresses transmitting at "on" sites (block 605). In one example, the counts are stored as a probability table (e.g., 200 in FIG. 2).

The association storer 405 (FIG. 4) builds a probability table by maintaining a count of the association of MAC addresses with transmissions from exposure sites that are on (block 607).

The example probability determiner 407 (FIG. 4) determines a probability that the unknown media device is located at a site based on the strength of a computed probability. In one example, the strength of the computed probability is based on the total number of detected MAC address transmissions from the plurality of sites (block 609).

Figure 7:
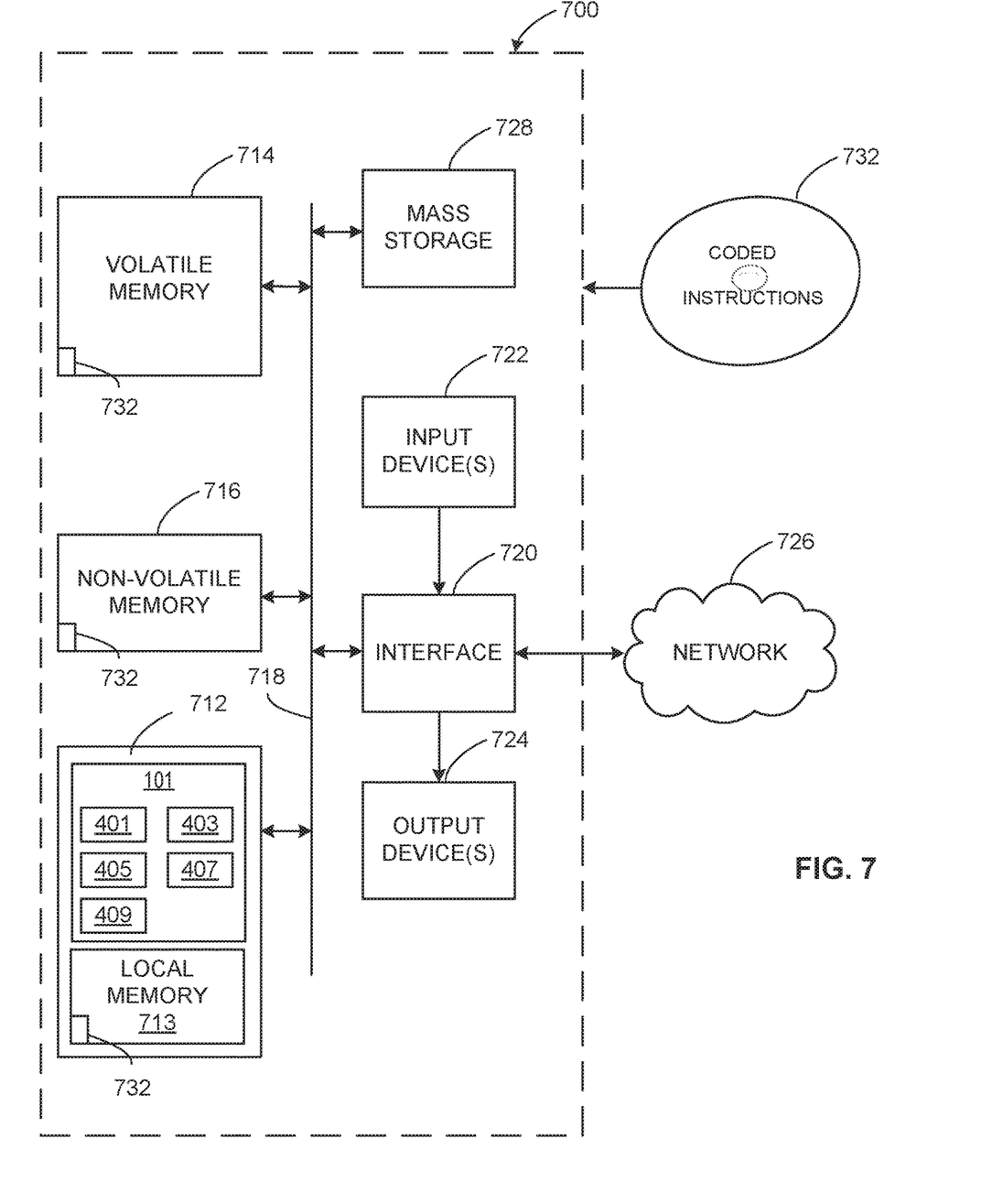
FIG. 7 is a block diagram of an example processor platform capable of executing the instructions of FIGS. 5 and 6 to implement the apparatus of FIG. 4.

FIG. 7 is a block diagram of an example processor platform 1000 capable of executing the instructions of FIGS. 5 and 6 to implement the apparatus of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In one example, unknown media device locator 101 of FIG. 1 can be included as a part of processor 712 as shown in FIG. 7. The example, unknown media device locator 101 includes an example media device detector 401, an example media transmission detector 403, an example association storer 405, an example probability determiner 407 and an example exposure site contact indicator 409.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 5 and 6 may be stored in the mass storage device 728, in the volatile memory 714, in the non-volatile memory 716, and/or on a removable tangible computer readable storage medium such as a CD or DVD.

From the foregoing, it will appreciate that the above disclosed methods, apparatus and articles of manufacture enable the calibration of panelist devices remotely. In one example, this is accomplished by determining a probability that an unknown media device is located at a particular place among the sites. Identifying the location of the unknown media device enables remote hardware calibration in a media exposure location.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for determining a location of media devices, the apparatus comprising:
    a media device detector to detect an unknown media device identified in monitoring data collected by an audience measurement device at a first location of a first media presentation device determined to have an "on" status;
    a media transmission detector to detect a media transmission associated with a device address;
    an association storer to:
        store an association of the device address with the unknown media device and the first location of the first media presentation device in a probability data structure, the association indicative of when the unknown media device transmits network communications during a period of time when the first media presentation device is determined to have the "on" status, the probability data structure including counts of a number of associations for the device address with the first location of the first media presentation device and respective locations of a plurality of media presentation devices;
        increase the counts when subsequent associations for the unknown media device with the first media presentation device or the plurality of media presentation devices that are determined to have the "on" status and the first location of the first media presentation device or the respective locations of the plurality of media presentation devices are stored; and
    a probability determiner to determine a probability that the unknown media device is located at the first location of the first media presentation device based on a total count of associations of the device address with the unknown media device and the location of the first media presentation device.

2. The apparatus of claim 1, further including:
    a contact prompter to prompt a contacting of an exposure site of the unknown media device when a condition that is based on the determined probability is satisfied.

3. The apparatus of claim 2, wherein the condition is a probability threshold.

4. The apparatus of claim 2, wherein the condition is an elapse of a predetermined period of time after a probability threshold has been reached.

5. The apparatus of claim 1, wherein the probability data structure correlates respective media access control (MAC) addresses with a plurality of sites.

6. The apparatus of claim 1, wherein the media transmission detector monitors media transmissions in an on-going manner.

7. The apparatus of claim 1, wherein a network communications monitor identifies a media device type of the unknown media device.

8. A method for determining a location of unknown media devices, the method comprising:
    detecting, by executing an instruction via a processor, an unknown media device identified in monitoring data collected by an audience measurement device at a first location of a first media presentation device determined to have an "on" status;
    detecting, by executing an instruction via the processor, a media transmission associated with a device address;
    storing, by executing an instruction via the processor, an association of the device address with the unknown media device and the first location of the first media presentation device in a probability data structure, the association indicative of when the unknown media device transmits network communications during a period of time when the first media presentation device is determined to have the "on" status, the probability data structure including counts of a number of associations for the device address with the first location of the first media presentation device and respective locations of a plurality of media presentation devices;
    increasing, by executing an instruction with the processor, the counts when subsequent associations for the unknown media device with the first media presentation device or the plurality of media presentation devices that are determined to have the "on" status and the first location of the first media presentation device or the respective locations of the plurality of media presentation devices are stored; and determining, by executing an instruction via the processor, a probability that the unknown media device is located at the first location of the first media presentation device based on a total count of associations of the device address with the unknown media device and the location of the first media presentation device.

9. The method of claim 8, further including:

prompting an exposure site of the unknown media device to be contacted when a condition that is based on the determined probability is satisfied.

10. The method of claim 9, wherein the condition is a probability threshold.

11. The method of claim 9, wherein the condition is an elapse of a predetermined period of time after a probability threshold has been reached.

12. The method of claim 8, wherein the determining comprises generating the probability data structure that correlates respective media access control (MAC) addresses with a plurality of sites.

13. The method of claim 8, wherein the determining includes continuous monitoring.

14. The method of claim 8, wherein a network communications monitor identifies a media device type of the unknown media device.

15. A non-transitory machine-readable storage medium comprising computer readable instructions which, when executed, cause a machine to at least:

detect an unknown media device identified in monitoring data collected by an audience measurement device at a location of a first media presentation device determined to have an "on" status;

detect a media transmission associated with a device address;

store an association of the device address with the unknown media device and the location of the first media presentation device in a probability data structure, the association indicative of when the unknown media device transmits network communications during a period of time when the first media presentation device is determined to have the "on" status, the probability data structure including counts of a number of associations for the device address with the location of the first media presentation device and respective locations of a plurality of media presentation devices;

increase the counts when subsequent associations for the unknown media device with the first media presentation device or the plurality of media presentation devices that are determined to have the "on" status and the location of the first media presentation device or the respective locations of the plurality of media presentation devices are stored; and determine a probability that the unknown media device is located at the location of the first media presentation device based on a total count of associations of the device address with the unknown media device and the location of the first media presentation device.

16. The non-transitory machine-readable storage medium of claim 15, wherein the computer readable instructions, when executed further cause the machine to:

prompt an exposure site of the unknown media device to be contacted when a condition that is based on the determined probability is satisfied.

17. The non-transitory machine: readable storage medium of claim 16, wherein the condition is a probability threshold.

18. The non-transitory machine: readable storage medium of claim 16, wherein the condition is an elapse of a predetermined period of time after a probability threshold has been reached.

19. The non-transitory machine-readable storage medium of claim 15, wherein the computer readable instructions, when executed, cause the machine to store comprises the association by at least generating the probability data structure that correlates respective media access control (MAC) addresses with a plurality of sites.

20. The non-transitory machine-readable storage medium of claim 15, wherein the determining includes continuous monitoring.

* * * * *

UNITED STATES PATENT AND TRADEMARK OFFICE
CERTIFICATE OF CORRECTION

| | | |
|---|---|---|
| PATENT NO. | : 11,146,414 B2 | |
| APPLICATION NO. | : 15/595613 | |
| DATED | : October 12, 2021 | |
| INVENTOR(S) | : Mark Cave et al. | |

It is certified that error appears in the above-identified patent and that said Letters Patent is hereby corrected as shown below:

In the Claims

In Column 18, Claim 19, Line 3, Delete "comprises".

Signed and Sealed this
Twenty-third Day of August, 2022

*Katherine Kelly Vidal*

Katherine Kelly Vidal
*Director of the United States Patent and Trademark Office*